(12) United States Patent
   Elmore

(10) Patent No.: US 9,663,224 B2
(45) Date of Patent: May 30, 2017

(54) SYSTEM FOR REMOVING A SPINDLE FROM A ROTOR ASSEMBLY

(71) Applicant: Walin Tools, LLC, Ft. Walton Beach, FL (US)

(72) Inventor: Jackie Elmore, Orangeburg, SC (US)

(73) Assignee: Walin Tools, LLC, Ft. Walton Beach, FL (US)

( * ) Notice: Subject to any disclaimer, the term of this patent is extended or adjusted under 35 U.S.C. 154(b) by 431 days.

(21) Appl. No.: 13/917,297

(22) Filed: Jun. 13, 2013

(65) Prior Publication Data

US 2014/0026403 A1  Jan. 30, 2014

Related U.S. Application Data

(60) Provisional application No. 61/659,196, filed on Jun. 13, 2012.

(51) Int. Cl.
| | |
|---|---|
| *B64C 27/32* | (2006.01) |
| *B64F 5/00* | (2006.01) |
| *B25B 27/02* | (2006.01) |
| *B64F 5/50* | (2017.01) |

(52) U.S. Cl.
CPC ............ *B64C 27/32* (2013.01); *B25B 27/023* (2013.01); *B64F 5/0036* (2013.01); *B64F 5/50* (2017.01); *Y10T 29/53* (2015.01)

(58) Field of Classification Search
CPC ..... B25B 27/02; B25B 27/023; B25B 27/026; B23P 19/025; B64C 27/32
See application file for complete search history.

(56) References Cited

U.S. PATENT DOCUMENTS

| 3,158,203 | A | 11/1964 | Grunfelder |
| 4,283,827 | A | 8/1981 | Abel |
| 4,771,528 | A | 9/1988 | Stromberg |
| 5,323,524 | A | 6/1994 | Stilwell |
| 6,012,211 | A | 1/2000 | Ochoa et al. |
| 6,415,491 | B1* | 7/2002 | Klann ............................. 29/259 |
| 6,502,293 | B1* | 1/2003 | Khurana ................. B25B 27/02 29/260 |

(Continued)

OTHER PUBLICATIONS

Rotor Hub Spindle Installer/Remover for Helicopters [online]. [Retrieved on Jun. 13, 2013]. Retrieved from the Internet: <http://http://marketplace.yet2.com/app/list/techpak?id=59122&sid=350&abc=0>.

*Primary Examiner* — Larry E Waggle, Jr.
*Assistant Examiner* — Seahee Yoon
(74) *Attorney, Agent, or Firm* — GrayRobinson, P.A.; Michael J. Colitz, III

(57) ABSTRACT

Disclosed a system for use in removing spindles from the main rotor of a rotary aircraft. The tool includes a faceplate that is designed to fit over a spindle after the associated rotor blade has been removed. One of more locking pins are then used to secure the faceplate to the spindle. The faceplate includes a series of four apertures within its four corners. Jack bolts are adapted to be secured within the apertures. The base of each jack bolts can be secured within bolt holes for the spindle mount. Backing nuts are threadably received on each of the jack bolts and are adapted to engage the faceplate. Jam nuts are also included for use in rotating each of the jack bolts. Rotation of the jam nuts causes rotation of the jack bolts. This, in turn, causes the face plate to pull the spindle out of the rotor.

4 Claims, 5 Drawing Sheets

(56) References Cited

U.S. PATENT DOCUMENTS

| | | |
|---|---|---|
| 7,770,277 B2 | 8/2010 | Wridt |
| D656,372 S | 3/2012 | Noyes |
| D662,797 S | 7/2012 | Noyes |
| 2010/0269321 A1 | 10/2010 | Noyes |
| 2012/0102704 A1 | 5/2012 | Barrios et al. |

* cited by examiner

SYSTEM FOR REMOVING A SPINDLE FROM A ROTOR ASSEMBLY

RELATED APPLICATION DATA

This application claims priority to Application Ser. No. 61/659,196 filed on Jun. 13, 2013 and entitled "Rotor Spindle Removal Tool." The contents of this application are fully incorporated herein for all purposes.

TECHNICAL FIELD

This disclosure relates to a system for removing a spindle from a rotor assembly of an aircraft.

BACKGROUND OF THE INVENTION

The maintenance and repair of aircraft is a difficult and time consuming process. These activities must be routinely performed with great precision to avoid catastrophic failures.

One such repair activity is the removal and/or replacement of the spindle from a main rotor blade assembly. Spindles are used in mounting rotor blades to the main rotor of a helicopter. A series of spindles are positioned about the rotor, with the number of spindles corresponding to the number of rotor blades employed by the aircraft.

The spindles are adjustable and are used to vary the pitch of the rotor blades. By pitching the rotor blades the orientation of the aircraft can be changed. A helicopter's repair and maintenance schedule requires that the spindles must occasionally be removed from the main rotor assembly. This is a time consuming and labor intensive process. Namely, when removing the spindles, care must be taken to ensure that neither the spindle nor the surrounding rotor assembly are damaged. This is difficult because spindles are heavy and must be manipulated by hand. Furthermore, when replacing spindles, care must be taken to ensure that the spindle is repositioned and affixed in exactly the correct orientation to ensure proper operation of the aircraft. A seal is typically positioned between the spindle and the rotor. This seal, which can be formed from an elastomeric material, often results in the spindle sticking to rotor. Complicating matters further is the fact that all these activities must be performed by maintenance workers that are perched atop the aircraft.

The difficulty in removing spindles was recognized in U.S. Pat. Pub. 2010/0269321 to Noyes. This publication discloses a tool for removing a spindle and/or an elastomeric bearing from a hub. The tool includes a coupler, an arm, and a weight that is slidably engaged with the arm. The coupler is designed to be secured to a spindle, which may in turn be secured to a bearing. The weight upon the arm can be slid by the operator to remove the spindle. Namely, the weight can be moved from a first position adjacent the coupler to a second position adjacent the handle. This allows the kinetic energy of the weight to be used in removing the bearing.

The tool disclosed by Noyes has significant drawbacks. Namely, the tool relies upon kinetic energy in order to forcibly remove the spindle from the rotor. This kinetic energy could potentially damage the spindle and/or rotor. Furthermore, it requires the maintenance worker to expend a great deal of effort in order to slide the weight along the arm. The spindle removal tool of the present disclosure is designed to overcome these and other shortcomings present in the background art.

SUMMARY OF THE INVENTION

This disclosure relates to a system for removing a spindle from a main rotor assembly of a helicopter.

One advantage of the system is that it allows for the precise removal and/or replacement of a spindle, thereby allowing the original orientation of the spindle relative to the rotor to be maintained.

Yet another advantage of the present system is that it minimizes the number of maintenance workers that are need to carry out a spindle removal and/or replacement operation.

A further advantage is achieved by providing a system that removes a spindle via a jack-type mechanism, thereby reducing the force needed to separate the jack and minimizing that danger of damaging associated equipment or injuring maintenance workers.

It is also an advantage of the present system to minimize the external equipment needed for the removal and/or replacement of a spindle.

The spindle removal system of the present disclosure further allows spindles to be removed without the maintenance worker expending a great deal of effort and without kinetic energy being imparted to the spindle.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

Figure 1:
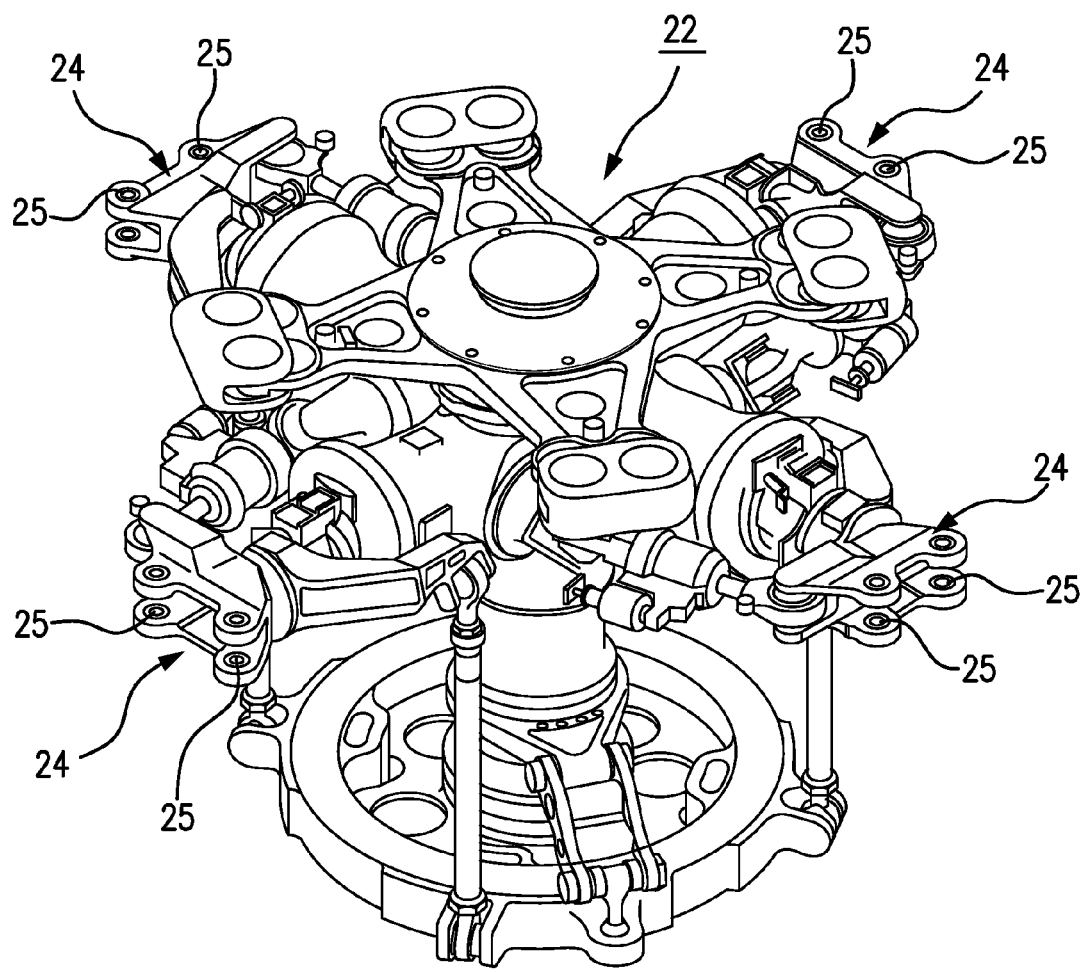
FIG. 1 is an illustration of a main rotor assembly.
Figure 2:
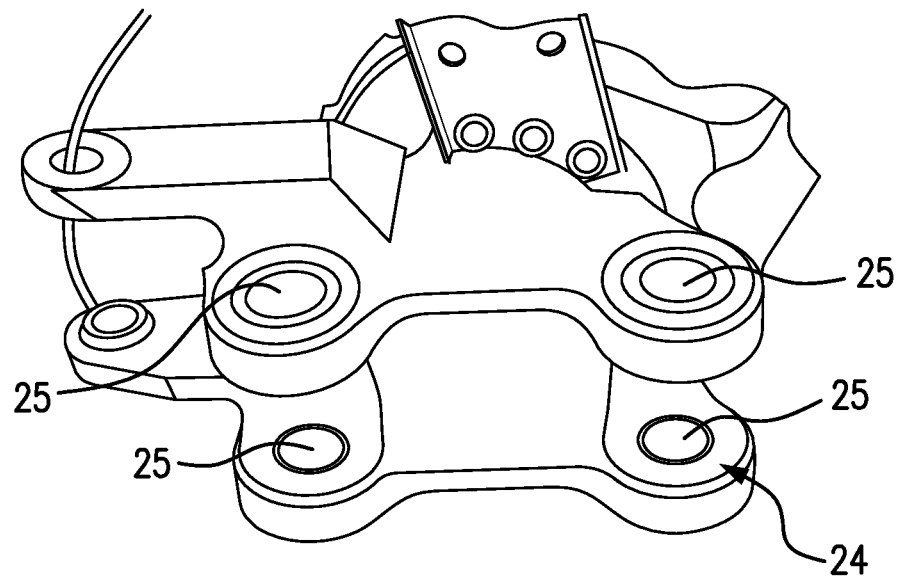
FIG. 2 is a detailed view of one spindle located at the periphery of the main rotor assembly.

| PARTS LIST |
|---|
| Assembly 20 |
| Rotor Assembly 22 |
| Spindle 24 |
| Rotor Blade Apertures 25 |
| Faceplate 26 |
| Central Opening 27 |
| Locking Pins 28 |
| Locking Apertures 30 |
| Jack Bolt Apertures 31 |
| Jack Bolts 32 |
| Jam Nuts 34 |
| Backing Nut 36 |

DETAILED DESCRIPTION OF THE DRAWINGS

The present invention relates to a system and tool for use in removing spindles from the main rotor of a rotary aircraft. The tool includes a faceplate that is designed to fit over a spindle after the associated rotor blade has been removed. One of more locking pins are then used to secure the faceplate to the spindle. The faceplate includes a series of four apertures within its four corners. Jack bolts are adapted to be secured within the apertures. The base of each jack bolt can be secured within bolt holes for the spindle mount. Backing nuts are threadably received on each of the jack bolts and are adapted to engage the faceplate. Jam nuts are also included for use in rotating each of the jack bolts. Rotation of the jam nuts causes rotation of the jack bolts. This, in turn, causes the face plate to pull the spindle out of the rotor. The various components of the present invention, and the manner in which they interrelate, are described in greater detail hereinafter.

The tool described herein is part of a system (20) that allows a spindle (24) to be removed from the rotor assembly (22) of a helicopter. The depicted main rotor assembly (22) is from a UH-60 "Blackhawk" helicopter and includes four peripheral spindle assemblies (24). However, system (20) can be used in connection with a wide variety of rotary aircraft, which may have varying numbers of spindle assemblies. As is known in the art, spindle assemblies are used in securing rotor blades to the main rotor assembly. In this regard, each spindle assembly (24) includes two sets of rotor blade apertures (25). These apertures (25) are positioned within two edges that extend from the face of the spindle (24). These apertures are for use in securing an individual rotor blade to the spindle.

Figure 3:
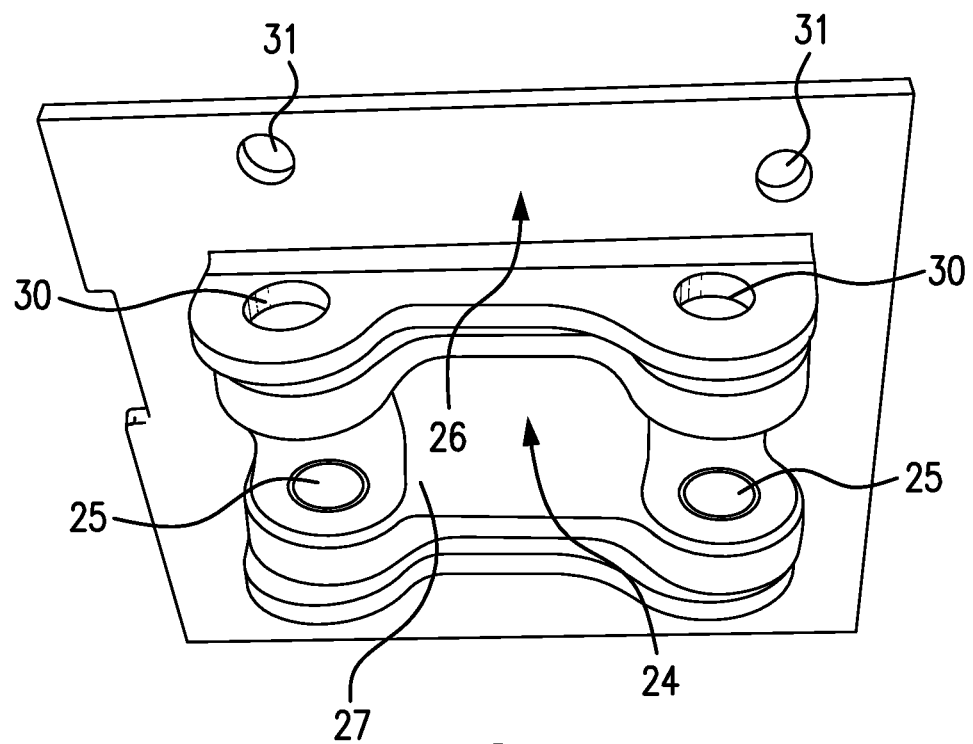
FIG. 3 is a detailed view of the face plate positioned over an associate spindle.
Figure 4:
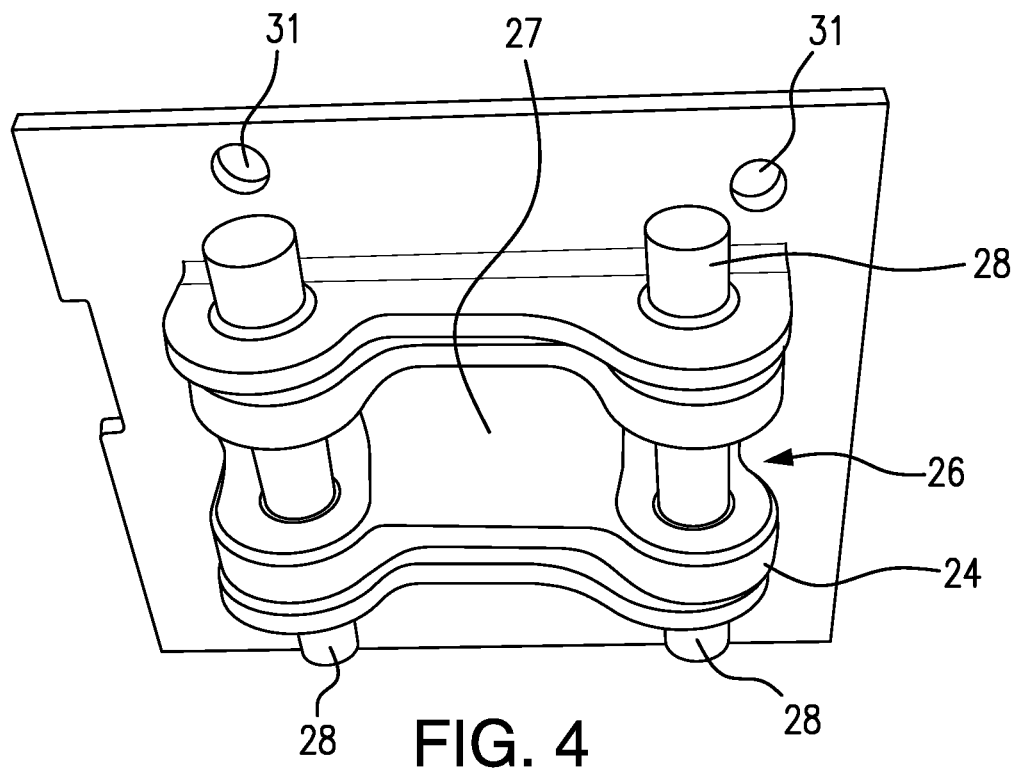
FIG. 4 is a detailed view of the face plate positioned over the associated spindle and with locking pins interconnecting the face plate to the spindle.
Figure 5:
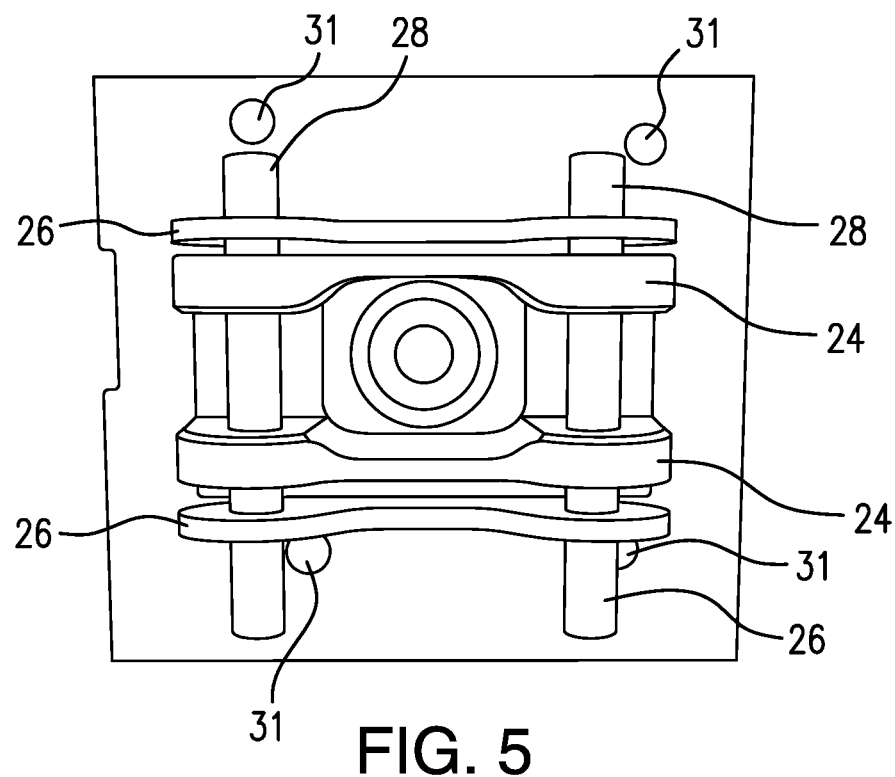
FIG. 5 is a detailed view of the face plate positioned over the associated spindle and with locking pins interconnecting the face plate to the spindle.
Figure 6:
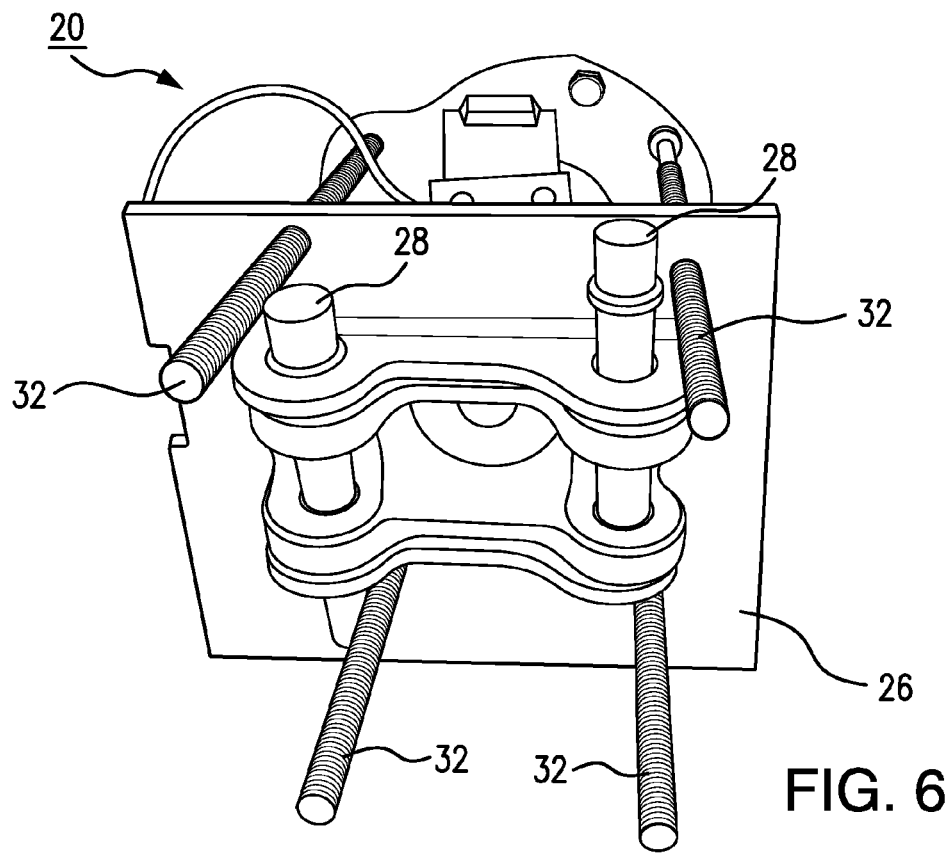
FIG. 6 is a detailed view of the face place positioned over the spindle and with jack bolts positioned through alignment holes in the face plate.

System (20) further includes a faceplate (26). If desired, a series of faceplates (26) can be included for each of the spindle assemblies (24). Each faceplate (26) includes an enlarged central opening (27). Adjacent each side of the opening is am edge. Each faceplate (26) further includes two sets of locking apertures (30) that are formed within these upstanding edges. Each faceplate (26) also includes four jack bolt apertures (31). Locking apertures (30) are positioned and dimensioned to align with the rotor blade apertures (25) of the spindle (24) (note FIG. 3). Furthermore, jack bolt apertures (31) are preferably formed through each of the four corners of faceplate (26). In use, an individual faceplate (26) is positioned over and secured to an associated spindle assembly (24). This is accomplished by positioning the rotor blade apertures (25) through the central opening (27). Thereafter, the two sets of rotor blade apertures (25) are aligned with the two sets of locking apertures (30). Two locking pins (28) are then secured through the aligned apertures (25 and 30) to secure the faceplate (26) to the spindle assembly (24).

Figure 7:
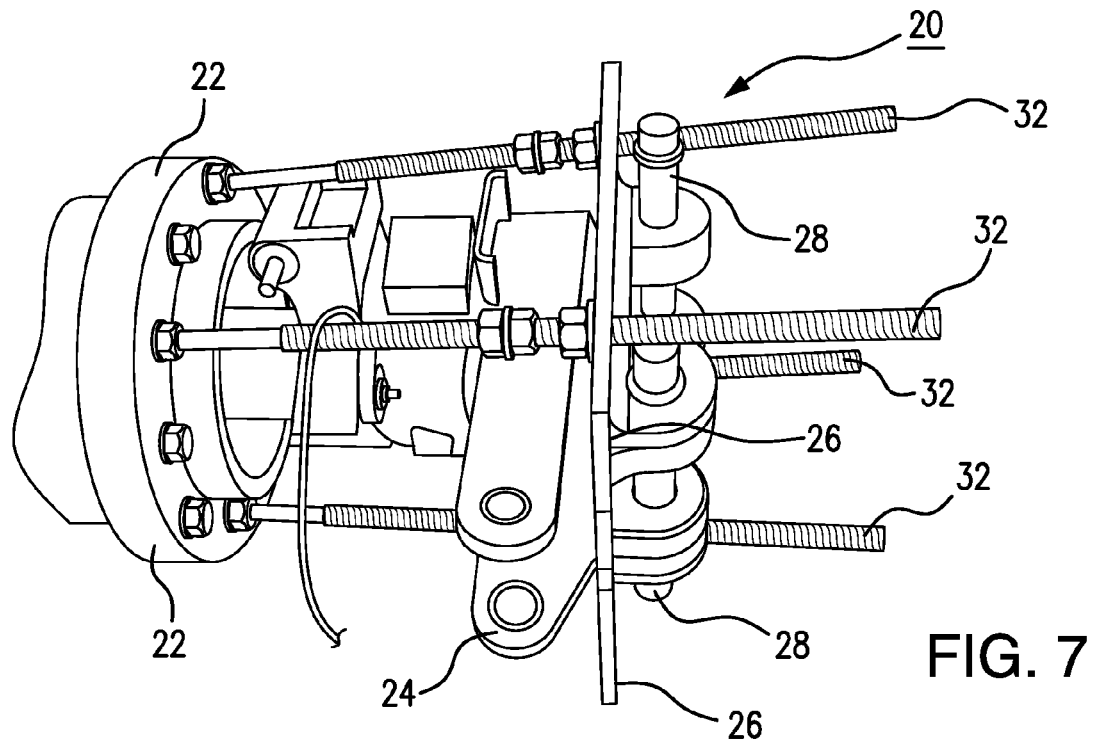
FIG. 7 is a detailed view of the jack bolts with the associated jam nuts and backing nut.
Figure 8:
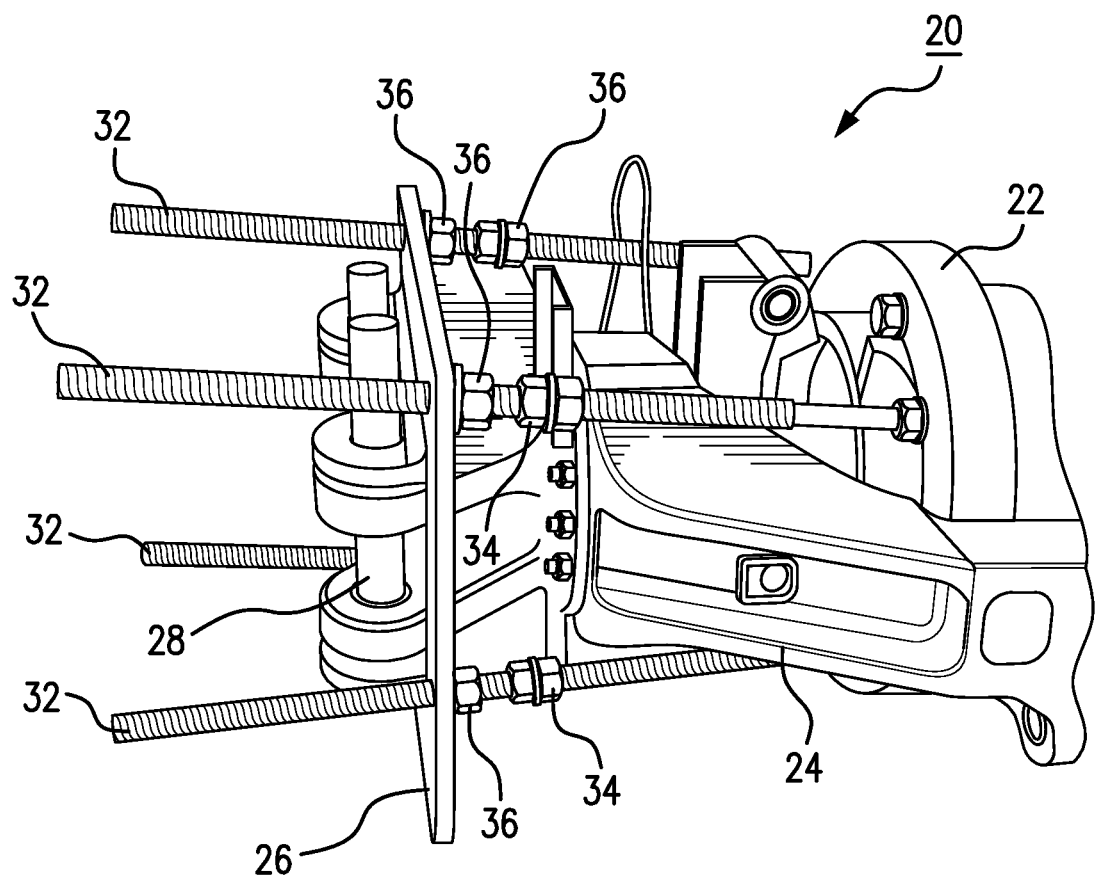
FIG. 8 is a detailed view of the jack bolts with the associated jam nuts and backing nut.

A series of four jack bolts (32) are then employed to remove the spindle (24) from rotor (22). Each jack bolt (32) is preferably threaded along the majority of its length. Jack bolts (32) are secured through each of the associated jack bolt apertures (31). The distal end of each jack bolt (32) extends outwardly from the rotor assembly (22) when in position. Likewise, the opposite (or proximal) end of each jack bolt (32) is mounted to a spindle mount bolt hole. Thus, each jack bolt (32) is secured between an alignment hole (31) in face plate (26) and a mount bolt hole in the rotor assembly (22). Each jack bolt (32) includes both a jam nut (34) and a backing nut (36). Each backing nut (36) contacts a corresponding corner of the faceplate (26)(note FIGS. 7-8). Rotation of each jam nut (34) causes a corresponding rotation in the associated jack bolt (32).

With jack bolts (32) properly positioned, the user can sequentially rotate each of the jam nuts (34). This rotation will cause the associated jack bolt (32) to rotate. As each jack bolt (32) rotates, the associated backing nut (36) will push against the faceplate (26). By sequentially rotating the various jack bolts (32), the backing nuts (36) will push against, and move, the face plate (26). Because faceplate (26) is secured to the spindle (24) (via locking pins (28)), movement of the faceplate (26) in this fashion will cause the spindle assembly (24) to be removed from the main rotor assembly (22). The process can be reversed for installing a spindle (24).

Thus, the disclosed system (20) is designed to remove the main rotor spindle (24) from the rotor hub assembly (22). Spindle removal tool is installed on the spindle (24) where the main rotor (22) would attach with two locking pins (28). Thereafter, four jack bolts (32) are positioned through alignment holes (31) in a faceplate (26) and into the spindle mount bolt holes. The jack bolts (32) are threaded rods with jam nuts (34) to turn rod (32). An additional nut (36) is included that presses against the back of the faceplate (26). As rod (32) is turned, spindle (24) is lifted (or "jacked") out of the rotor hub assembly (22).

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A system (20) for removing a spindle (24) from a rotor assembly (22), the system (20) comprising:
    a main rotor assembly (22), the main rotor assembly (22) including at least one spindle assembly (24) about a periphery of the main rotor assembly, the spindle assembly (24) including two sets of rotor blade apertures (25);
    a faceplate (26) including a central opening (27), two sets of locking apertures (30), and four jack bolt apertures (31), the faceplate (26) being positioned over the spindle assembly (24) with the rotor blade apertures (25) being positioned through the central opening (27) and in alignment with the two sets of locking apertures (30), locking pins (28) secured through the rotor blade apertures (25) and the locking apertures (30) to thereby secure the faceplate (26) to the spindle assembly (24);
    a series of four jack bolts (32), each of the jack bolts (32) being secured through one of the jack bolt apertures (31) within the faceplate (26) and including a jam nut (34) and a backing nut (36), each of the backing nuts (36) contacting the faceplate (26) and each of the jam nuts (34) being used to rotate the associated jack bolt (32);
    wherein rotation of the jam nuts (34) causes rotation of the jack bolts (32) and further causing each of the backing nuts (36) to push against the faceplate (26), and wherein rotation of the jam nuts (34) causes the spindle assembly (24) to be removed from the main rotor assembly (22).

2. The system (20) as described in claim 1 wherein the central opening (27) receives the spindle assembly (24).

3. The system (20) as described in claim 1 wherein the jack bolts (32) are threaded along the majority of their length.

4. The system (20) as described in claim 1 wherein the rotor assembly (22) is a helicopter rotor.

\* \* \* \* \*